United States Patent
Kana et al.

(10) Patent No.: US 10,889,302 B2
(45) Date of Patent: Jan. 12, 2021

(54) METHODS FOR MONITORING THE OUTPUT PERFORMANCE OF STATE ESTIMATORS IN NAVIGATION SYSTEMS

(71) Applicant: Honeywell International Inc., Morris Plains, NJ (US)

(72) Inventors: Zdenek Kana, Dubnany (CZ); Jindrich Dunik, Plzen (CZ); Vibhor L Bageshwar, Minneapolis, MN (US); Milos Sotak, Slavkov u Brna (CZ)

(73) Assignee: Honeywell International Inc., Charlotte, NC (US)

( * ) Notice: Subject to any disclaimer, the term of this patent is extended or adjusted under 35 U.S.C. 154(b) by 275 days.

(21) Appl. No.: 16/020,745

(22) Filed: Jun. 27, 2018

(65) Prior Publication Data

US 2020/0001886 A1    Jan. 2, 2020

(51) Int. Cl.
| | | |
|---|---|---|
| *B60W 50/02* | (2012.01) | |
| *G01C 21/16* | (2006.01) | |
| *G01C 25/00* | (2006.01) | |

(52) U.S. Cl.
CPC ....... *B60W 50/0205* (2013.01); *G01C 21/165* (2013.01); *G01C 25/005* (2013.01); *B60W 2050/0215* (2013.01)

(58) Field of Classification Search
CPC ...... B60W 50/0205; B60W 2050/0215; G01C 21/165; G01C 25/005; G01C 21/20; G01S 19/47; G01S 19/20
See application file for complete search history.

(56) References Cited

U.S. PATENT DOCUMENTS

| | | |
|---|---|---|
| 5,760,737 A | 6/1998 | Brenner |
| 9,146,322 B2 | 9/2015 | Coatantiec |
| 9,547,086 B2 | 1/2017 | Dunik et al. |
| 9,658,339 B2 | 5/2017 | Destelle |
| 9,784,844 B2 | 10/2017 | Kana et al. |
| 2015/0145724 A1 | 5/2015 | Kana et al. |

(Continued)

FOREIGN PATENT DOCUMENTS

| | | |
|---|---|---|
| EP | 1102397 A2 | 5/2001 |
| EP | 1612514 A1 | 1/2006 |

(Continued)

OTHER PUBLICATIONS

European Patent Office, "Extended European Search Report from EP Application No. 19182739.3", from Foreign Counterpart to U.S. Appl. No. 16/020,745, dated Jan. 2, 2020, pp. 1-7, Published: EP.

(Continued)

*Primary Examiner* — Alan D Hutchinson
(74) *Attorney, Agent, or Firm* — Fogg & Powers LLC

(57) ABSTRACT

A system and methods for monitoring the integrity of navigation measurement information are disclosed. One method includes receiving a plurality of navigation measurement values, computing a first set and second set of estimates of the navigation measurement values, comparing the first set to the second set, and if the second set is statistically consistent with the first set, computing a plurality of sub-sets of the second set of estimates, computing a sub-solution for each sub-set of the second set of estimates, and computing an integrity value for each sub-solution.

19 Claims, 7 Drawing Sheets

(56) References Cited

U.S. PATENT DOCUMENTS

| | | |
|---|---|---|
| 2017/0131407 A1 | 5/2017 | Dunik et al. |
| 2017/0299393 A1* | 10/2017 | Steinhardt ............ G01C 21/165 |
| 2019/0280674 A1* | 9/2019 | Berkemeier ......... G05D 1/0088 |

FOREIGN PATENT DOCUMENTS

| | | |
|---|---|---|
| EP | 2706379 A1 | 3/2014 |
| EP | 2784445 A2 | 10/2014 |
| EP | 2869083 B1 | 7/2017 |

OTHER PUBLICATIONS

Kana et al., "Architectures for High Integrity Multi-Constellation Solution Separation", Proceedings of the 27th International Technical Meeting of the ION Satellite, Sep. 2014, pp. 3554-3565, ION GNSS+ 2014.

Mansouri et al., "Kullback-Leibler divergence-based Improved Particle Filter", Mar. 2014, pp. 1-7.

Chiang et al, "The Performance Analysis of a Real-Time Integrated INS/GPS Vehicle Navigation System with Abnormal GPS Measurement Elimination", "Sensors", "www.mdpi.com/journal/sensors", dated Aug. 15, 2013, pp. 10599-10622.

Rakipi et al, "Integrity Monitoring in Navigation Systems: Fault Detection and Exclusion RAIM Algorithm Implementation", "Journal of Computer and Communications", "http://dx.doi.org/10.4236/jcc.2015.36004", dated May 28, 2015, pp. 25-33, Publisher: Scientific Research Publishing.

* cited by examiner

METHODS FOR MONITORING THE OUTPUT PERFORMANCE OF STATE ESTIMATORS IN NAVIGATION SYSTEMS

BACKGROUND

Modern navigation systems utilize state estimation algorithms to estimate the kinematic state vector (e.g., position, angular orientation, and velocity) of vehicles (e.g., land vehicle, spacecraft, aircraft, satellites, etc.) utilizing measurements from a set of sensors. These state estimation algorithms are often implemented utilizing local (also known as Gaussian or Kalman) filters, based on certain assumptions on the models that govern the estimated state vector, which can be referred to as "state estimators". As such, these Kalman filters are optimal estimators for state vectors governed by linear Gaussian system models. However, in the field of civil aviation navigation system design, the state vectors are governed by non-linear system models and the local filters are typically implemented utilizing Extended Kalman Filters (EKFs). Generally, these (local) EKFs are computationally efficient; however, the convergence, stability, or consistency of their estimates of the statistics of the state vector cannot be generally ensured.

Specifically, the state estimator estimates the kinematic state vector of the vehicle utilizing a two-step process. In the first step, system models are utilized to predict the kinematic state vector forward to the epoch of an available measurement from the sensor set. This estimate is considered as the new predicted state vector. In the second step, the state estimator processes the navigation measurements (e.g., sensor measurements) from the sensor set to update the predicted kinematic state vector. This estimate is considered as the updated (filtered) state vector. The state estimator attempts to reconcile the predicted state vector and measurement vector from the sensor set to obtain updated estimates of the state vector under the assumption that both the predicted state vector and measurement vector are uncertain. However, the system models, or equations, that are utilized to estimate the kinematic, or navigation, state vector are non-linear and, therefore, the navigation system requires an EKF to estimate the statistics of the navigation state vector.

Notably, state estimation algorithms for state vectors governed by nonlinear systems can be divided into the two groups: algorithms utilizing global filters and algorithms utilizing local filters. The global filter-based algorithms can provide consistent estimates of the state vector for almost all types of nonlinearities of the system models without the assumption that the system models are locally linear. Global filters estimate the conditional probability density functions (PDFs) of the state vector that depend on the system models, system uncertainty, and the navigation measurements. These global filter techniques are suitable for estimating the state vector governed by highly nonlinear or non-Gaussian systems, but these state vector estimates are obtained at the cost of substantially high computational demands. Examples of the global filters are the particle filter or the point-mass filter.

In contrast, the local filter-based estimating techniques (e.g., Unscented Kalman Filters (UKFs) and EKFs) can be utilized to extend the capabilities of the Kalman filter so that it can be utilized to estimate the statistics of the state vector with approximations on the nonlinear systems. For example, first-order local filter (e.g., the first-order EKF) techniques can provide computationally efficient estimates of the statistics of the state vector in the form of the mean and covariance matrix of the conditional PDF. However, these local filter-based techniques have limited performance in terms of consistency, stability, and convergence. For example, the local filter estimates are generally inconsistent and unstable, primarily, due to the approximation of local linearity of the system models and the assumption that the statistics of vectors (state, measurement, and uncertainty) are Gaussian. Additionally, among the local filters, there are differences. In general, the high-order local filters (e.g., UKF) produce estimates with better consistency, stability, and convergence than the first order local filters (e.g., EKF).

For the reasons stated above and for other reasons stated below which will become apparent to those skilled in the art upon reading and understanding the specification, there is a need in the art for a statistical technique that can be utilized to monitor the consistency and convergence of the local filter's output and, thereby, enhance the integrity of the navigation system utilizing the measurement vectors provided by the sensor set.

SUMMARY

The present invention provides a statistical technique that can be utilized to monitor the consistency, stability, and convergence of the local filter's output, and enhance the integrity of the output of a navigation system utilizing a plurality of filters that operate on measurements from a sensor set.

DRAWINGS

Embodiments of the present disclosure can be more easily understood and further advantages and uses thereof more readily apparent, when considered in view of the description of the preferred embodiments and the following figures in which.

In accordance with common practice, the various described features are not drawn to scale but are drawn to emphasize features relevant to the present disclosure. Reference characters denote like elements throughout the figures and text.

DETAILED DESCRIPTION

In the following detailed description, reference is made to the accompanying drawings that form a part hereof, and in which is shown by way of specific illustrative embodiments in which the embodiments may be practiced. These embodiments are described in sufficient detail to enable those skilled in the art to practice the embodiments, and it is to be understood that other embodiments may be utilized and that logical, mechanical, and electrical changes may be made without departing from the scope of the present disclosure. The following detailed description is, therefore, not to be taken in a limiting sense.

The present invention provides a technological improvement over existing navigation system techniques for monitoring the output performance of state estimators. As such, the present invention achieves an improved technological result in the existing navigation system practice of monitoring the integrity of the navigation measurement information received, as described in more detail below.

Figure 1:
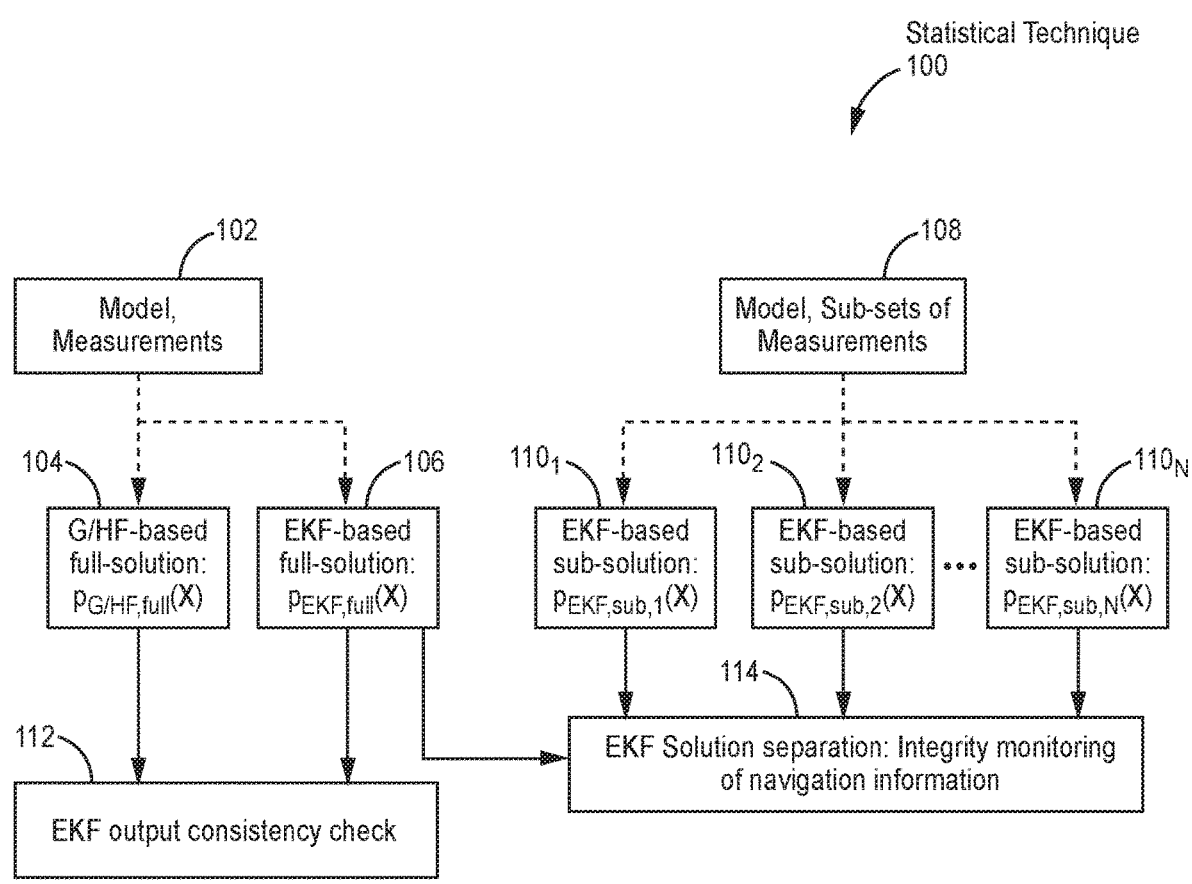
FIG. 1 is a block diagram illustrating a statistical technique that can be utilized to monitor the output performance of a local filter-based state estimator, in accordance with one example embodiment of the present invention.

FIG. 1 is a block diagram illustrating a statistical technique 100 that can be utilized to monitor the output performance of a local filter-based state estimator, in accordance with one example embodiment of the present invention. For example, in one embodiment, the local low-order filter-based state estimator can be implemented with a first-order EKF. In a second embodiment, the state estimator can be implemented with any suitable high-order local filter (e.g., UKF, second-order EKF) depending on the required accuracy of the estimated state vector statistics and/or the computational complexity supported by the navigation system. In some embodiments, the statistical technique 100 can be utilized for estimation (or prediction) of measurement information received from navigation systems, such as, GPS measurement information, hybrid GPS/INS measurement information, Attitude and Heading Reference System (AHRS) measurement information, GPAHRS measurement information, and the like.

Note that, for some embodiments, the statistical technique 100 can be deemed more suitable, for example, if the regions of linear validity for the EKF-based "full-solution" and each of the EKF-based "sub-solutions" are substantially the same. If so, then as indicated by the exemplary embodiment illustrated in FIG. 1, the set of EKFs being utilized can be extended with a global or high-order local filter (e.g., G/HF), which performs the same or similar estimation tasks as the EKF-based "full-solution" filter and thus enhances the ability of the state estimator to provide consistent, stable, and converging state vector estimates at its output. If the statistical estimates of EKF and G/HF based "full-solution" filters are substantially equivalent, then the assumptions of local linearity of the EKF system model are deemed valid.

Referring now to the exemplary embodiment for the statistical technique 100 illustrated in FIG. 1, a suitable (e.g., navigation) system model and a plurality of (e.g., navigation) measurements 102 are provided as inputs to a "full-solution" G/HF 104 and a "full-solution" EKF 106. Also, the system model and a plurality of sub-sets of the navigation measurement information 108 are provided as inputs to a plurality of "sub-solution" EKFs 110(1)-110(N). The outputs of the "full-solution" G/HF 104 and the "full-solution" EKF 106 are statistically compared to determine the consistency of the output 112 of the "full-solution" EKF, and the EKF-based "full-solution" 106 is statistically compared with the EKF-based "sub-solution" EKFs 110(1)-110(N) utilizing, for example, a known solution separation technique in order to monitor the integrity of the navigation measurement information measured by the sensor set 114.

Figure 2:
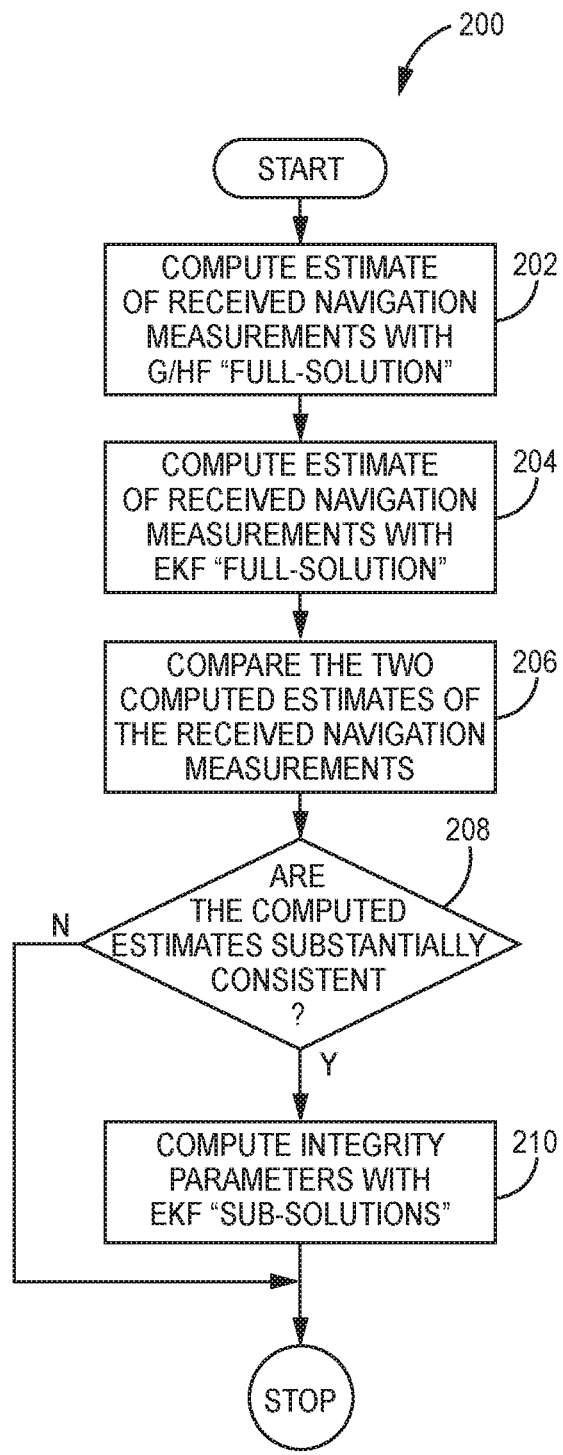
FIG. 2 is a flow diagram illustrating a method that can be utilized to implement the statistical technique illustrated in FIG. 1, in accordance with one example embodiment of the present invention.

FIG. 2 is a flow diagram illustrating a method 200, which can be utilized to implement one example embodiment of the present invention. For example, the method 200 can be utilized to implement the Statistical Technique 100 illustrated in FIG. 1. As such, referring to the exemplary embodiment illustrated in FIG. 2, the method 200 begins (e.g., at a time epoch denoted as "k") by computing an estimate of the received navigation information with the G/HF "Full-Solution" utilizing the available system model and the received navigation measurement information (202). For this embodiment, this computed estimate can be described in the form of a PDF denoted as $p_{G/HF,full}(x)$. Next, the method 200 computes an estimate of the received navigation information with the EKF "Full-Solution" utilizing the available system model and measurement information (204). For this embodiment, this computed estimate also can be described in the form of a PDF denoted as $p_{EKF,full}(x)$. The method then statistically compares the two computed estimates $p_{G/HF,full}(x)$ and $p_{EKF,full}(x)$ (206), and determines if the estimates are substantially consistent (208). If the statistical comparison indicates that the two estimates $p_{G/HF,full}(x)$ and $p_{EKF,full}(x)$ are substantially consistent (e.g., the EKF full-solution is deemed "healthy" and thus substantially consistent with the G/HF full-solution), then the method computes the measurement integrity-related parameters utilizing the EKF-based "Sub-Solutions" (210). Specifically, utilizing the system model, EKF, and sub-sets of the received navigation measurements, the method computes the EKF-based "Sub-Solutions", $p_{EKF,sub,n}(x)$, wherein n=1, . . . , N.

However, returning to (208), if the statistical comparison indicates that the two estimates, $p_{G/HF,full}(x)$ and $p_{EKF,full}(x)$ are not substantially consistent, then the method 200 is terminated. Notably, only one G/HF is utilized for this example embodiment. Therefore, this solution is computationally feasible. However, more importantly, this solution enables the state estimator to monitor for faults in the received navigation measurement information as well as for possible faults in the EKF algorithm.

Figure 3:
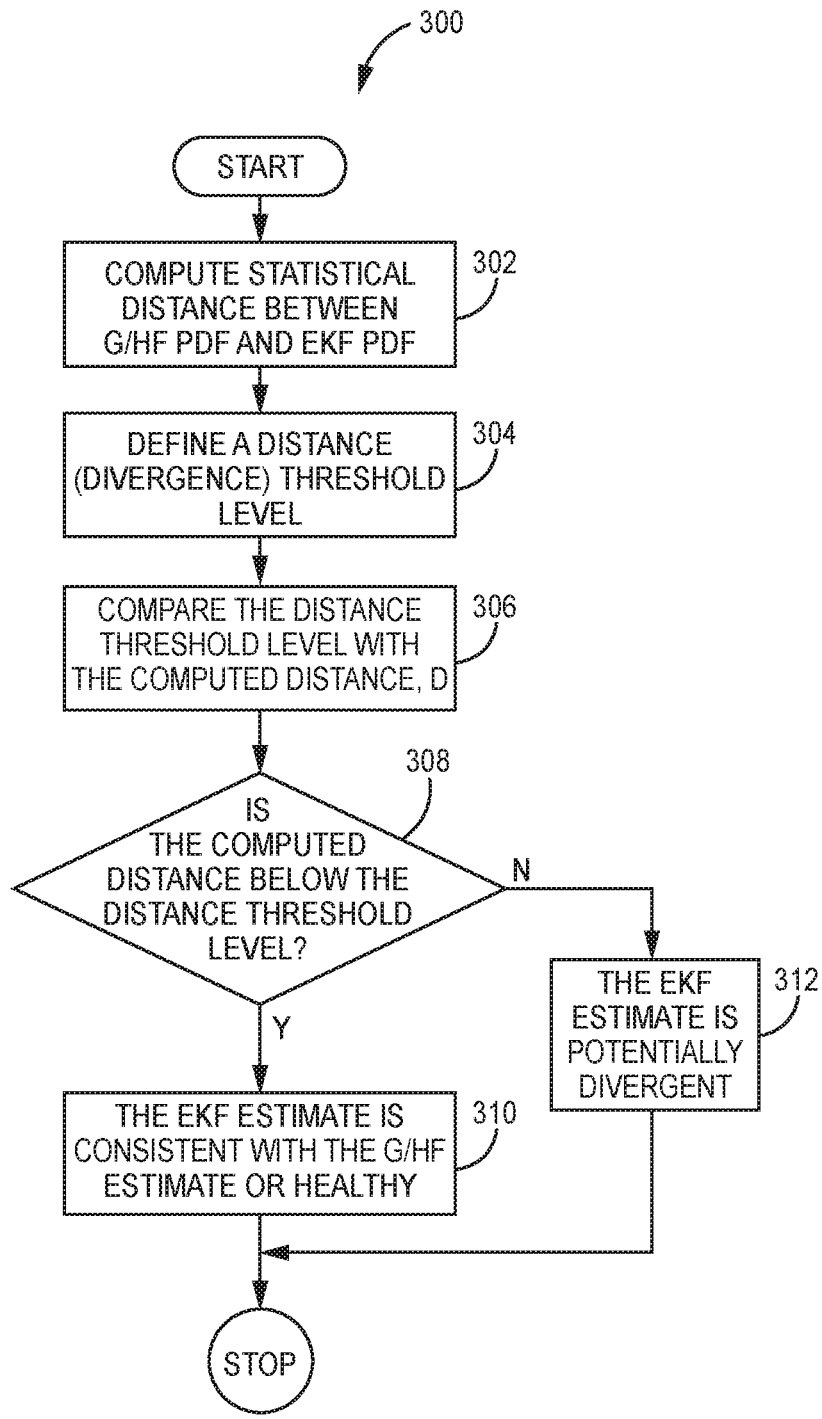
FIG. 3 is a flow diagram illustrating a method that can be utilized to perform a statistical comparison of a plurality of PDFs, in accordance with one example embodiment of the present invention.

FIG. 3 is a flow diagram illustrating a method 300, which can be utilized to perform a statistical comparison of a plurality of PDFs, in accordance with one example embodiment of the present invention. For example, the method 300 can be utilized to compare the EKF PDF with the G/HF PDF illustrated in FIG. 2. Referring to FIG. 3, the method 300 begins by computing a distance between the PDFs $p_{G/HF,full}(x)$ and $p_{EKF,full}(x)$ (302). For example, the "distance" can be computed utilizing a suitable statistical divergence technique, such as, the Kullback-Liebler's divergence technique, Rényi's divergence technique, and the like. However, for this example embodiment, the statistical distance between the G/HF PDF and the EKF PDF is computed utilizing an integral distance measuring (divergence) technique, which can be expressed in equation form as:

$$D = \int_{-\infty}^{\infty} \| p_{G/HF,full}(x) - p_{EKF,full}(x) \| dx, \quad (1)$$

where the term $\|\cdot\|$ can be an arbitrary norm. The output of this integral "distance" measuring technique is typically a scalar variable. Note that in Equation (1), the $p_{EKF,full}(x)$ term provides a statistical estimate consisting of the first moment and second central moment of the state vector. In other words, the $p_{EKF,full}(x)$ term in Equation (1) provides an estimate in the form of the state mean vector and state covariance matrix. These moments can be assumed to form a Gaussian distribution determined by the moments. Also note that, in some embodiments, several EKF and G/HF PDF estimate comparisons can be made utilizing the above-described "distance" measurement criteria.

Next, the method 300 defines a user specified threshold "distance" (304), and compares this threshold "distance" with the computed distance, D (306). The method 300 then determines if the computed distance, D, is below the user specified threshold distance (308). If (at 308), the computed distance, D, is determined to be below the user specified threshold distance, then the EKF estimate is deemed to be consistent with the G/HF estimate and thus considered to be "healthy" (310). The method 300 is then terminated. However, if (at 308) the computed distance, D, is not below the user specified threshold, then the EKF estimate is inconsistent with the G/HF estimate and the two estimated PDFs are potentially divergent (312). The method 300 is then terminated (and a user is informed).

Figure 4:
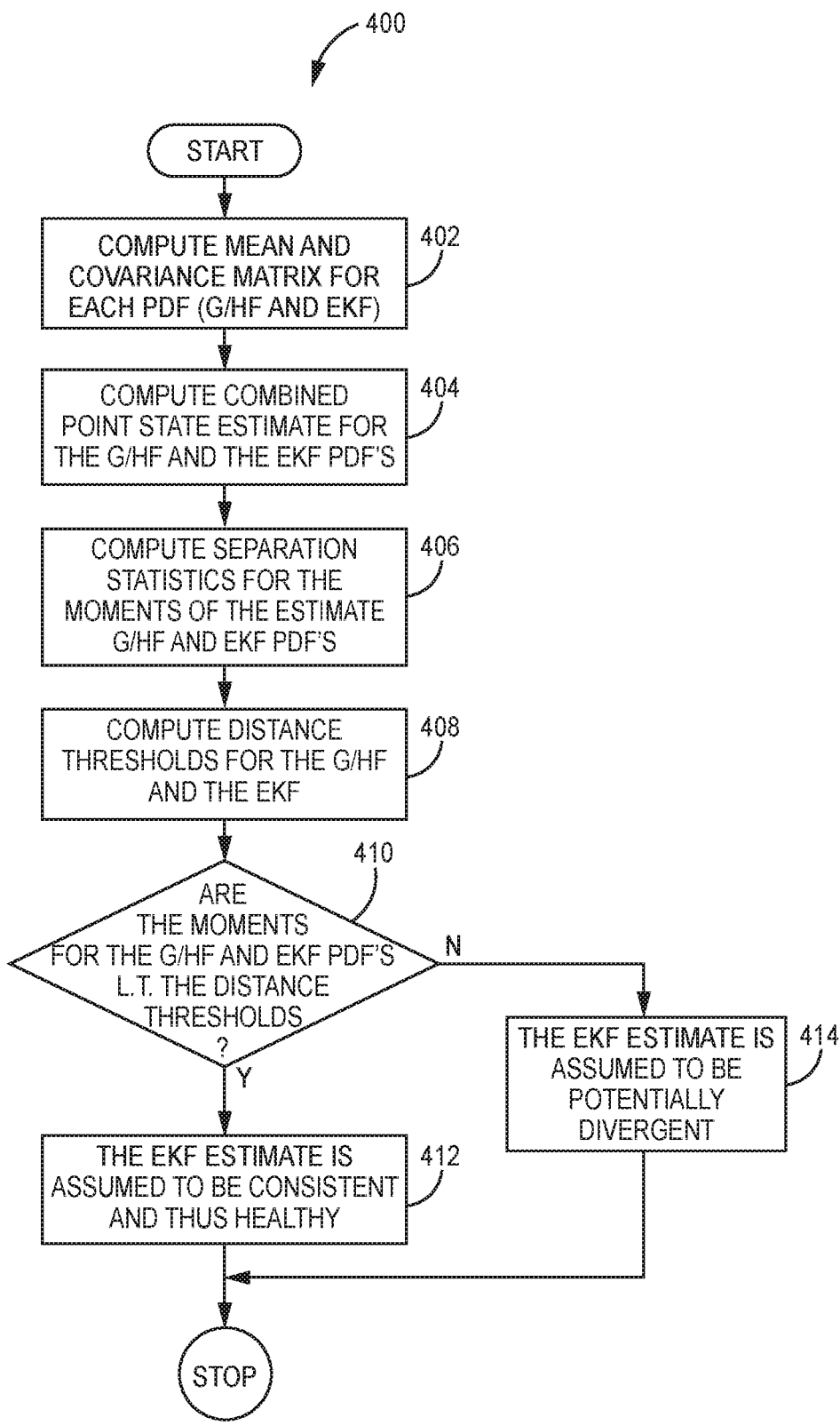
FIG. 4 is a flow diagram illustrating a second method that can be utilized to perform a statistical comparison of the PDF of a state vector estimated utilizing a local filter with a PDF of a state vector estimated utilizing a global/high-order filter, in accordance with one example embodiment of the present invention.

FIG. 4 is a flow diagram illustrating a method 400 that can be utilized to statistically compare an EKF PDF and G/HF PDF, in accordance with a second example embodiment of the present invention. Note that instead of computing the integral distance, D, on the basis of the entire PDFs, the distance, D, can be alternatively computed merely with a set of moments of the estimated PDFs $p_{G/HF}(x)$ and $p_{EKF}(x)$. Utilizing selected moments of the PDFs is advantageous because it limits the computational complexity necessary to compare the two PDFs. Referring to FIG. 4, the method 400 begins by computing the mean and covariance matrix for each PDF (402). The mean for the estimated PDF $p_{G/HF,full}(x)$ can be expressed as follows:

$$\hat{x}_{G/HF} = E_{p_{G/HF}}[x], \qquad (2)$$

and the covariance matrix for the estimated PDF $p_{G/HF,full}(x)$ can be expressed as follows:

$$P_{G/HF} = \text{cov}_{p_{G/HF}}[x]. \qquad (3)$$

Also, the mean for the estimated PDF $p_{EKF,full}(x)$ can be expressed as follows:

$$\hat{x}_{EKF} = E_{p_{EKF}}[x], \qquad (4)$$

the covariance matrix for the estimated PDF $p_{EKF,full}(x)$ can be expressed as follows:

$$P_{EKF} = \text{cov}_{p_{EKF}}[x], \qquad (5)$$

and the cross-covariance matrix for the estimated PDF $p_{EKF,full}(x)$ and the estimated PDF $p_{GH/F,full}(x)$ can be expressed as follows:

$$P_{EKF,G/HF} = \text{cov}[\hat{x}_{G/HF}, \hat{x}_{EKF}] \qquad (6)$$

Note that the actual form of the cross-covariance matrix in Equation (6) is determined by the specific global or high-order filter (G/HF) utilized. Next, the method 400 computes a combined point state estimate (404), which can be expressed as follows:

$$\hat{x} = C_{G/HF}\hat{x}_{G/HF} + C_{EKF}\hat{x}_{EKF}, \qquad (7)$$

where the diagonal matrices $C_{G/HF}$, $C_{EKF}$ are defined by the user and have diagonal elements across both matrices whose sum equals to one. In some embodiments, the diagonal elements of the matrices $C_{G/HF}$, $C_{EKF}$ can be constant for all time epochs and all elements of the state vector involved. In other embodiments, the diagonal elements of the matrices $C_{G/HF}$, $C_{EKF}$ can vary with respect to time and be different for the particular state vector elements involved. Next, the method computes separation statistics for the moments involved (406). Specifically, for this embodiment, the term $\hat{x}_{G/HF}$ for the estimated PDF $p_{G/HF,full}(x)$ can be statistically separated into two parts:

$$\tilde{x}_{G/HF} = \hat{x} - \hat{x}_{G/HF} \quad \text{and} \quad \text{its} \quad \text{covariance} \quad \text{matrix}$$
$$P_{\tilde{x},G/HF} = \text{cov}[\tilde{x}_{G/HF}], \qquad (8)$$

Similarly, for this embodiment, the term $\hat{x}_{EKF}$ for the estimated PDF $p_{EKF,full}(x)$ can be statistically separated into two parts:

$$\tilde{x}_{EKF} = \hat{x} - \hat{x}_{EKF} \quad \text{and} \quad \text{its} \quad \text{covariance} \quad \text{matrix}$$
$$p_{\tilde{x},EKF} = \text{cov}[\tilde{x}_{EKF}]. \qquad (9)$$

Next, the method computes distance (divergence) thresholds $d_{G/HF}$ and $d_{EKF}$ based on the user-defined probability of a false alert, $P_{FA}$ and the covariance matrices $P_{\tilde{x},G/HF}$ and $p_{\tilde{x},EKF}$ provided by the G/HF and the EKF (408). The method then determines if the moments for the G/HF and EKF PDF are less than the respective distance thresholds (410). In other words, the method determines if the magnitude $|\tilde{x}_{G/HF}|$ is less than the computed distance, $d_{G/HF}$, and the magnitude $|\tilde{x}_{EKF}|$ is less than the computed distance, $d_{EKF}$. If so, then the EKF estimate is considered to be statistically consistent or "healthy" (412), and the input state measurements may be utilized with confidence by the navigation system involved. Returning to (410), if the method determines that the magnitude $|\tilde{x}_{G/HF}|$ is not less than the computed distance, $d_{G/HF}$, or the magnitude $|\tilde{x}_{EKF}|$ is not less than the computed distance, $d_{EKF}$, then the EKF estimate is assumed to be potentially divergent (414). The method is then terminated.

Figure 5:
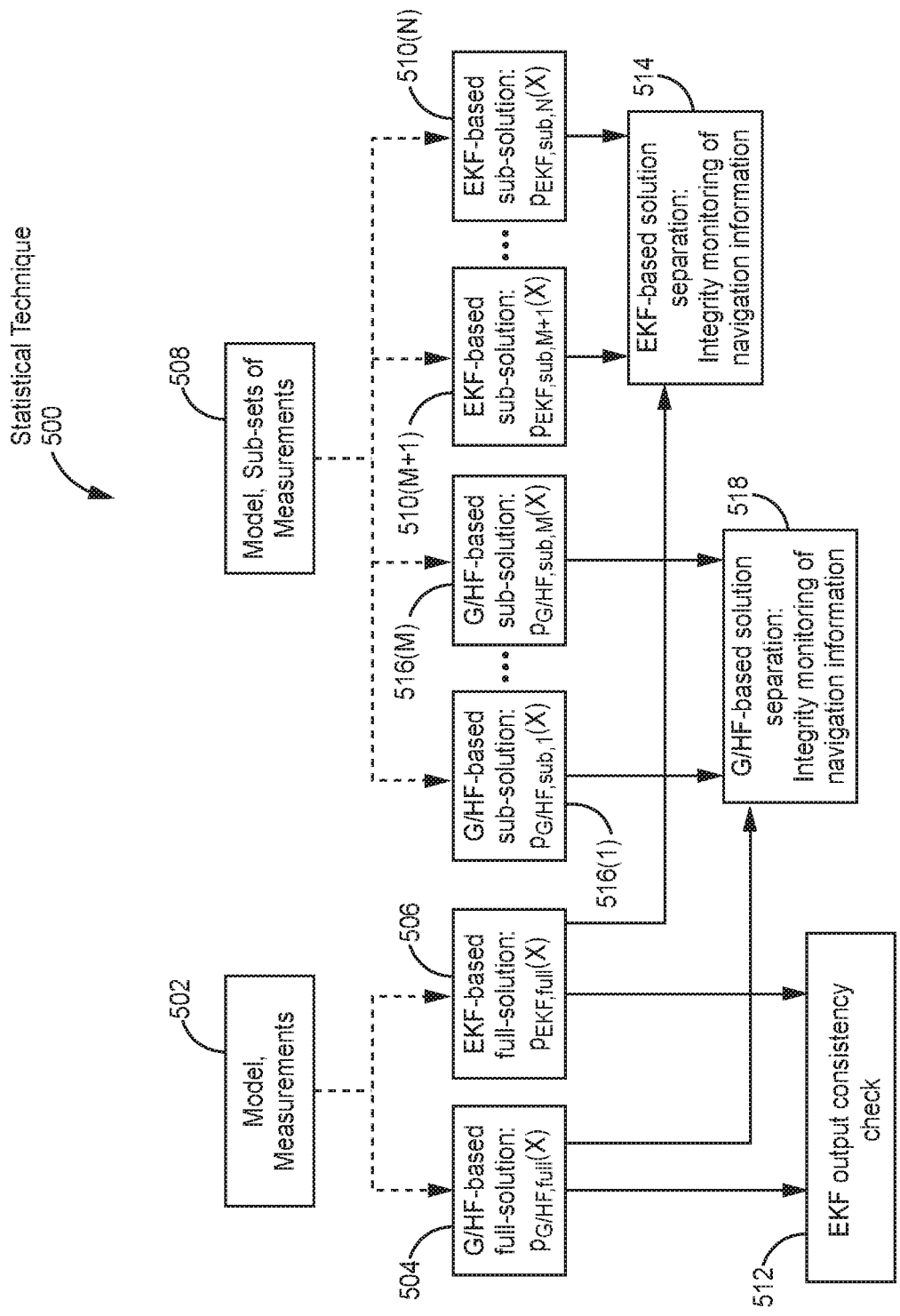
FIG. 5 is a second statistical technique that can be utilized to monitor the output performance of a local filter-based state estimator, in accordance with one example embodiment of the present invention.

FIG. 5 is a block diagram illustrating a statistical technique 500 that can be utilized to monitor the output performance of a local filter-based state estimator, in accordance with a second example embodiment of the present invention. For example, in this embodiment, the low-order local filter-based state estimator can be implemented utilizing an EKF. In a second embodiment, the state estimator can be implemented with any suitable local filter (e.g., UKF, first-order local filter, higher-order local filter, and the like) depending on the level of estimation accuracy and/or computational complexity desired. In some embodiments, the statistical technique 500 can be utilized for state estimation of measurement information received from navigation systems, such as, GPS measurement information, hybrid GPS/INS measurement information, AHRS measurement information, GPAHRS measurement information, and the like.

Note that, for some embodiments, the statistical technique 500 can be deemed more suitable, for example, when the system's statistical observability is based on one (or combination of multiple) measurement(s). It shall be noted, that the total number of measurements is denoted as N and the number of measurements needed for system statistical observability is denoted as M, where M<N. For the example embodiment illustrated in FIG. 5, the statistical technique 500 extends the set of EKFs with additional G/HFs that are configured to perform substantially the same estimation tasks as the EKFs. Also, the statistical technique 500 substitutes a plurality of G/HF-based sub-solutions for a plurality of the EKF-based sub-solutions illustrated, for example, in FIG. 1. As such, referring to FIG. 5, for this example embodiment, a suitable (e.g., navigation) system model and a plurality of (e.g., navigation) measurements 502 are provided as inputs to a "full-solution" G/HF 504 and a "full-solution" EKF 506. Also, the system model and a plurality of sub-sets of the navigation measurement information 508 are provided as inputs to a plurality of "sub-solution" EKFs 510(M+1)-510(N) and "sub-solution"

G/HFs 516(1)-516(M). Note that the G/HF sub-solutions are derived from the measurement plurality sub-set(s), which are driving the system's statistical observability. The outputs of the "full-solution" G/HF 504 and the "full-solution" EKF 506 are statistically compared to determine the consistency of the output 512 of the "full-solution" EKF 506. The EKF-based "full-solution" 506 is statistically compared with the EKF-based "sub-solution" EKFs 510(M+1)-510(N) utilizing, for example, a solution separation technique in order to monitor the integrity of the navigation measurement information being received 514. Similarly, the G/HF-based "full-solution" 504 is statistically compared with the G/HF-based "sub-solution" G/HFs 516(1)-516(M) utilizing, for example, the solution separation technique described above, in order to monitor the integrity of the navigation measurement information being received 518.

Figure 6:
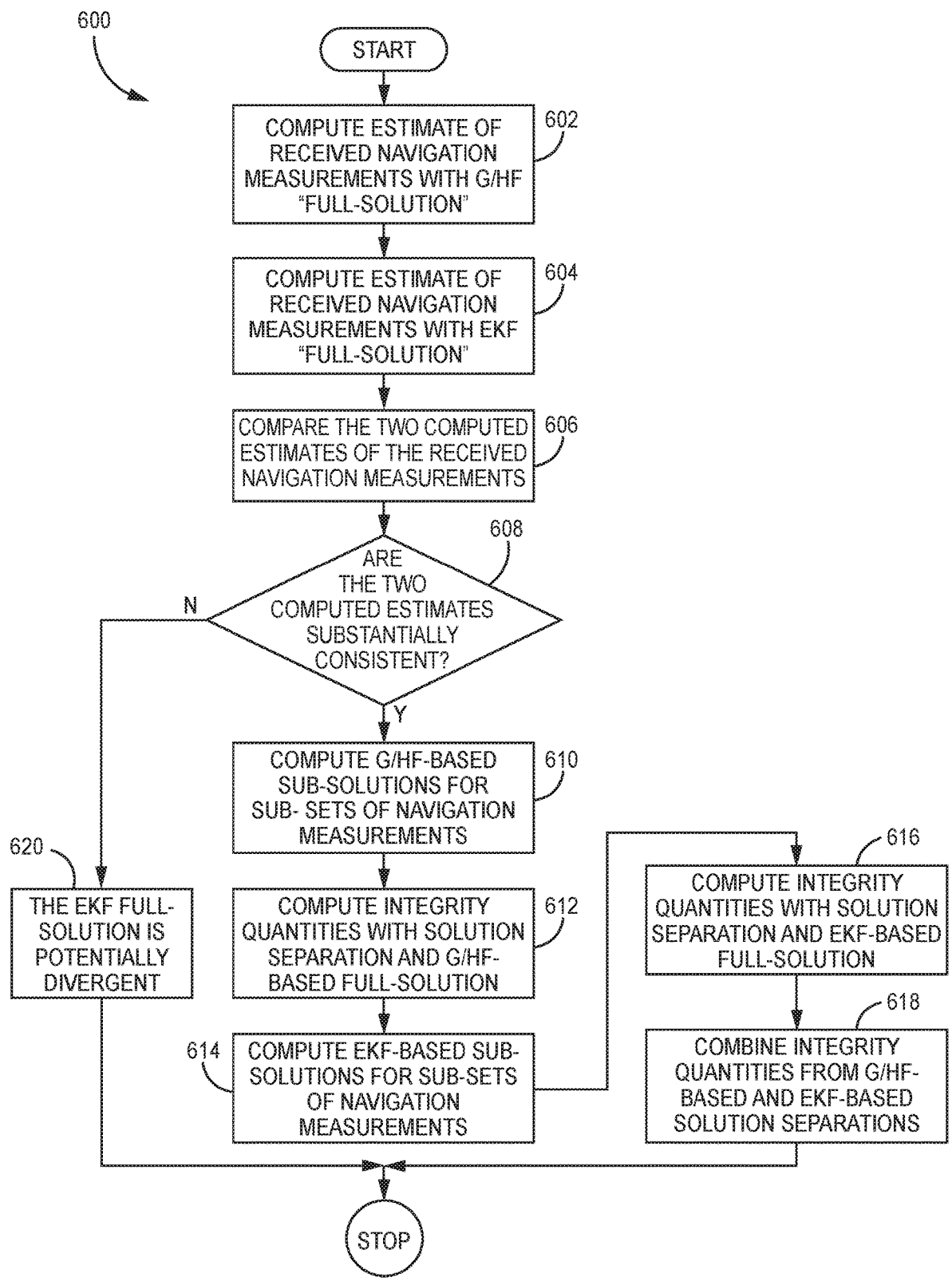
FIG. 6 is a flow diagram illustrating a method that can be utilized to implement the statistical technique illustrated in FIG. 5, in accordance with one example embodiment of the present invention.

FIG. 6 is a flow diagram illustrating a method 600, which can be utilized to implement one example embodiment of the present invention. For example, the method 600 can be utilized to implement the statistical technique 500 illustrated in FIG. 5. As such, referring to the exemplary embodiment illustrated in FIG. 6, the method 600 begins by computing an estimate of the received navigation information with the G/HF "full-solution" utilizing the available system model and the received navigation measurement information (602). For example, the method 200 described above at (202) can be utilized to make this computation. As such, for this embodiment, the computed estimate can be described in the form of a PDF denoted as $p_{G/HF,full}(x)$. Next, the method 600 computes an estimate of the received navigation information with the EKF "full-solution" utilizing the available system model and measurement information (604). For example, the method 200 described above at (204) can be utilized to make this computation. As such, for this embodiment, the computed estimate also can be described in the form of a PDF denoted as $p_{EKF,full}(x)$. The method then statistically compares the two computed estimates $p_{G/HF,full}(x)$ and $p_{EKF,full}(x)$ (606), and determines if the estimates are consistent (608). For example, the method 200 described above at (206) and (208) can be utilized to make these computations. As such, if (at 608) the statistical comparison indicates that the two estimates $p_{G/HF,full}(x)$ and $p_{EKF,full}(x)$ are substantially consistent (e.g., the EKF full-solution is deemed "healthy" and thus substantially consistent with the G/HF full-solution), then the method computes the G/HF-based sub-solutions for the sub-sets of navigation measurements $p_{G/HF,sub,n}(x)$, where n=1, . . . , M (610). The method then computes integrity-related quantities for the navigation measurements utilizing solution separation and the G/HF-based full-solution (612). Next, the method computes the EKF-based sub-solutions for the sub-sets of navigation measurements $p_{EKF,sub,n}(x)$, where n=(M+1), . . . , N (614). The method then computes integrity-related quantities for the navigation measurements utilizing solution separation and the EKF-based full-solution (616). The method then combines the integrity quantities from the G/HF-based and the EKF-based solution separation computations (618).

However, returning to (608), if the statistical comparison indicates that the two estimates, $p_{G/HF,full}(x)$ and $p_{EKF,full}(x)$ are not substantially consistent, then the EKF full-solution is deemed potentially divergent (620), and the method 600 is terminated. Note that this solution is computationally feasible if M is small, because (M+1) G/HFs are utilized. In any event, this technique enables the state estimator to monitor for faults in the received navigation measurement information as well as for a possible failure of the EKF algorithm.

Figure 7:
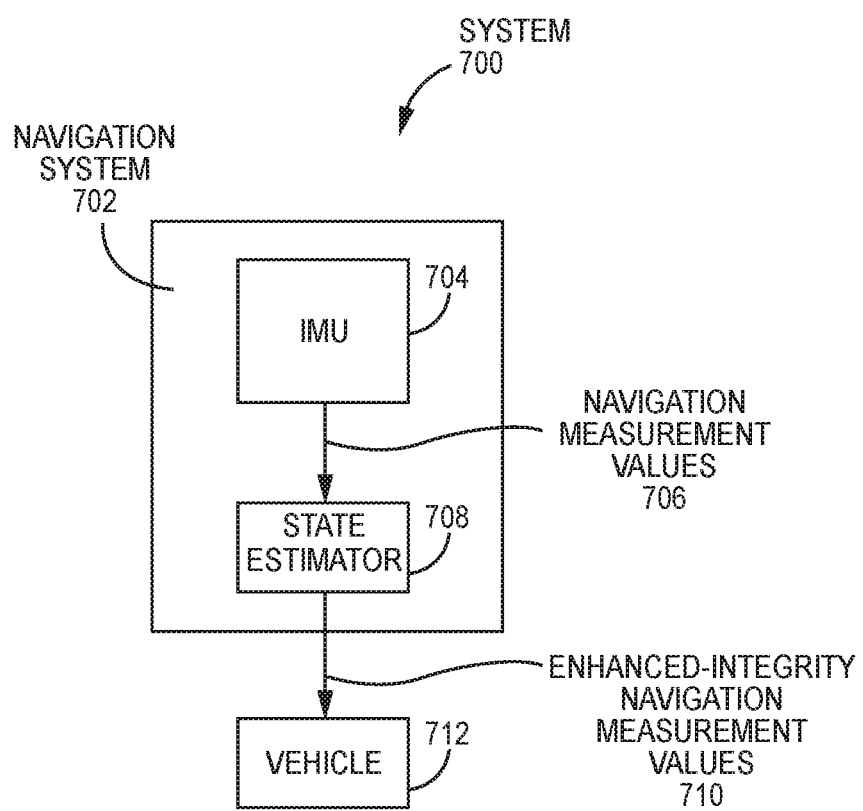
FIG. 7 is a block diagram illustrating a navigation system that can be utilized to implement one example embodiment of the present invention.

FIG. 7 is a block diagram illustrating a system 700, which can be utilized to implement one example embodiment of the present invention. For example, in some embodiments, the system 700 can be utilized to implement enhanced-integrity monitoring of measurement values provided by navigation systems such as, for example, a GPS, INS, hybrid GPS/INS, AHRS or GPAHRS navigation system. In one embodiment, the system 700 can be utilized to implement a statistical technique that can monitor the consistency and convergence of a local filter's output and, thereby, enhance the integrity of the navigation system utilizing measurement vectors provided by a sensor set coupled to the navigation system.

Referring to the exemplary embodiment illustrated in FIG. 7, the system 700 includes a navigation system 702. For example, the navigation system 702 can be a GPS, INS, hybrid GPS/INS, AHRS or GPAHRS navigation system. The navigation system 702 includes an inertial measurement unit (IMU) 704. For example, in one embodiment, the IMU 704 provides measurement information or values 706 that can be utilized to calculate a vehicle's attitude, angular rate of turn, linear velocity, heading, inclination, acceleration, position and the like. In any event, the IMU 704 is coupled to a state estimator 708 for operable communications therebetween. As such, in one example embodiment, the state estimator 708 receives the navigation measurement values 706 from the IMU 704 and, implementing the statistical technique illustrated in FIG. 1, computes a set of estimates of the navigation measurement values with a global or local filter and a system model, and computes a second set of estimates of the navigation measurement values with a local filter and the system model. The state estimator 708 then compares the first set of estimates with the second set of estimates. If the second set of estimates is statistically consistent with the first set of estimates, the state estimator 708 computes a plurality of sub-sets of the second set of estimates, a sub-solution for each sub-set of the second set of estimates, and then computes an integrity value for each sub-solution. As such, the state estimator 708 monitors the integrity of the navigation measurement values 706 provided by the IMU 704. The monitored, enhanced-integrity navigation measurement values 710 output from the state estimator 708 are then coupled to a vehicle (e.g., airborne, land-based, sea-based vehicle) 712. In accordance with the above-described teachings of the present disclosure, the state estimator 708 can effectively monitor and thereby enhance the integrity of the navigation measurement values provided by the IMU 704.

The methods and techniques described above may be implemented in digital electronic circuitry, or with a programmable processor (for example, a special-purpose processor or a general-purpose processor such as a computer) firmware, software, or in combinations of them. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instructions to, a data storage system, at least one input device, and at least one output device. Generally, a processor will receive instructions and data from a read-only memory and/or a random access memory or other tangible, non-transitory storage medium or media. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and DVD disks. Any of the foregoing may be supplemented by, or incorporated in, specially-designed application-specific integrated circuits (ASICs) or Field Programmable Gate Arrays (FGPAs).

It should be understood that elements of the above described embodiments and illustrative figures may be used in various combinations with each other to produce still further embodiments which are explicitly intended as within the scope of the present disclosure.

EXAMPLE EMBODIMENTS

Example 1 includes a method for monitoring the integrity of navigation measurement information, comprising: receiving a plurality of navigation measurement values; computing a first set of estimates of the plurality of navigation measurement values utilizing a global filter or a local filter having an order O and a system model; computing a second set of estimates of the plurality of navigation measurement values utilizing a local filter having an order lower than O and the system model; comparing the first set of estimates to the second set of estimates; determining if the second set of estimates is statistically consistent with the first set of estimates; and if the second set of estimates is statistically consistent with the first set of estimates, computing a plurality of sub-sets of the second set of estimates of the plurality of navigation measurement values, computing a sub-solution for each sub-set of the second set of estimates of the plurality of navigation measurement values, and computing an integrity value for each sub-solution.

Example 2 includes the method of Example 1, wherein the computing the first set of estimates comprises computing the first set of estimates utilizing an extended Kalman filter (EKF).

Example 3 includes the method of any of Examples 1-2, wherein the computing the first set of estimates comprises computing the first set of estimates utilizing a global or high-order filter (G/HF).

Example 4 includes the method of any of Examples 1-3, wherein the computing the second set of estimates of the plurality of navigation measurement values comprises computing the second set of estimates utilizing an EKF.

Example 5 includes the method of any of Examples 1-4, wherein the comparing the first set of estimates to the second set of estimates comprises computing a statistical distance between the first set of estimates and the second set of estimates, defining a distance threshold level, and comparing the distance threshold level with the computed statistical distance.

Example 6 includes the method of Example 5, further comprising determining if the computed statistical distance is less than the distance threshold level, and if the computed statistical distance is less than the distance threshold level, determining that the first set of estimates is consistent with the second set of estimates.

Example 7 includes the method of any of Examples 5-6, further comprising determining if the computed statistical distance is less than the distance threshold level, and if the computed statistical distance is not less than the distance threshold level, determining that the first set of estimates is not consistent with the second set of estimates and is potentially divergent.

Example 8 includes the method of any of Examples 1-7, wherein the determining if the second set of estimates is statistically consistent with the first set of estimates comprises: computing a first mean and a first covariance matrix for a first estimated probability density function (PDF) associated with the low-order local filter; computing a second mean and a second covariance matrix for a second estimated PDF associated with the global or high order filter; computing a combined mean and covariance state estimate for the first estimated PDF and the second estimated PDF; computing a plurality of separation statistics for the first estimated PDF and the second estimated PDF; computing a first distance threshold for the first estimated PDF and a second distance threshold for the second estimated PDF; determining if a separation statistic associated with the first estimated PDF is less than the first distance threshold, and a separation statistic associated with the second estimated PDF is less than the second distance threshold; and if the separation statistic associated with the first estimated PDF is less than the first distance threshold, and the separation statistic associated with the second estimated PDF is less than the second distance threshold, determining that the first set of estimates are consistent with the second set of estimates.

Example 9 includes the method of any of Examples 1-8, wherein the receiving the plurality of navigation measurement values comprises receiving a plurality of state measurements for a vehicle in transit.

Example 10 includes the method of any of Examples 1-9, wherein the receiving the plurality of navigation measurement values comprises receiving a plurality of state measurements for an aircraft, spacecraft, satellite, land-based vehicle, or water-based vehicle in transit.

Example 11 includes a method for monitoring the integrity of estimated navigation information, comprising: receiving a plurality of navigation measurement values; computing a first set of estimates of the estimated navigation information utilizing a system model, the plurality of navigation measurement values, and a global filter or a local filter having an order O; computing a second set of estimates of the estimated navigation information utilizing the system model, the plurality of navigation measurement values, and a local filter having an order lower than O; comparing the first set of estimates to the second set of estimates; determining if the second set of estimates is statistically consistent with the first set of estimates; and if the second set of estimates is statistically consistent with the first set of estimates: computing a plurality of subsets of the first set of estimates for the plurality of navigation measurement values utilizing the global filter or the local filter having order O: computing a plurality of subsets of the second set of estimates for the plurality of navigation measurement values utilizing the local filter having the order lower than O; computing a sub-solution for each sub-set of the first set of estimates of the plurality of navigation measurement values; computing a sub-solution for each sub-set of the second set of estimates of the plurality of navigation measurement values; computing an integrity value for each sub-solution for the first set of estimates; computing an integrity value for each sub-solution of the second set of estimates; and combining the integrity values for the sub-solutions of the first set of estimates with the integrity values for the sub-solutions of the second set of estimates.

Example 12 includes the method of Example 11, wherein the computing the first set of estimates of the navigation information comprises utilizing the system model, the plurality of navigation measurement values, and a G/HF.

Example 13 includes the method of any of Examples 11-12, wherein the computing the plurality of subsets of the first set of estimates for the plurality of navigation measurement values comprises utilizing a G/HF, and the computing the plurality of subsets of the second set of estimates for the plurality of navigation measurement values comprises utilizing an EKF.

Example 14 includes the method of any of Examples 11-13, wherein the computing the integrity value for each sub-solution for the first and second sets of estimates comprises computing the integrity values utilizing a G/HF full-solution and a plurality of G/HF sub-solutions, and computing the integrity values utilizing an EKF full-solution and a plurality of EKF sub-solutions.

Example 15 includes a navigation system, comprising: an inertial measurement unit (IMU) configured to generate a plurality of navigation state measurement values; and a state estimator coupled to the IMU, wherein the state estimator is configured to receive a plurality of the navigation measurement values, compute a first set of estimates of the plurality of navigation measurement values utilizing a global filter or a local filter having an order O and a system model, compute a second set of estimates of the plurality of navigation measurement values utilizing a local filter having an order lower than O and the system model, compare the first set of estimates to the second set of estimates, determine if the second set of estimates is statistically consistent with the first set of estimates, and if the second set of estimates is statistically consistent with the first set of estimates, compute a plurality of sub-sets of the second set of estimates of the plurality of navigation measurement values, compute a sub-solution for each sub-set of the second set of estimates of the plurality of navigation measurement values, and compute an integrity value for each sub-solution.

Example 16 includes the navigation system of Example 15, wherein the state estimator is configured to compute the first set of estimates utilizing a G/HF.

Example 17 includes the navigation system of any of Examples 15-16, wherein the state estimator is configured to compute the second set of estimates utilizing an EKF.

Example 18 includes the navigation system of any of Examples 15-17, wherein the state estimator is configured to compute the second set of estimates utilizing the filter having the order lower than O.

Example 19 includes the navigation system of any of Examples 1-18, wherein the state estimator is configured to compute a statistical distance between the first set of estimates and the second set of estimates, define a distance threshold level, and compare the distance threshold level with the computed statistical distance.

Example 20 includes the navigation system of any of Examples 15-19, wherein the navigation system comprises a navigation system onboard an aircraft, spacecraft, satellite, land-based vehicle, or water-based vehicle in transit.

Although specific embodiments have been illustrated and described herein, it will be appreciated by those of ordinary skill in the art that any arrangement, which is calculated to achieve the same purpose, may be substituted for the specific embodiment shown. This application is intended to cover any adaptations or variations of the presented embodiments. Therefore, it is manifestly intended that embodiments be limited only by the claims and the equivalents thereof.

What is claimed is:

1. A method for monitoring integrity of navigation measurement information, comprising:
   receiving a plurality of navigation measurement values for a vehicle in transit from a sensor set;
   computing a first set of estimates of the plurality of navigation measurement values utilizing a global filter or a local filter having an order O and a system model;
   computing a second set of estimates of the plurality of navigation measurement values utilizing a local filter having an order lower than O and the system model;
   comparing the first set of estimates to the second set of estimates;
   determining if the second set of estimates is statistically consistent with the first set of estimates;
   when the second set of estimates is statistically consistent with the first set of estimates, computing a plurality of sub-sets of the second set of estimates of the plurality of navigation measurement values, computing a sub-solution for each sub-set of the second set of estimates of the plurality of navigation measurement values, and computing an integrity value for each sub-solution;
   calculating enhanced-integrity navigation values based on the first set of estimates, the second set of estimates, and the integrity value for each sub-solution; and
   coupling the enhanced-integrity navigation values to the vehicle in transit.

2. The method of claim 1, wherein the computing the first set of estimates comprises computing the first set of estimates utilizing an extended Kalman filter (EKF).

3. The method of claim 1, wherein the computing the first set of estimates comprises computing the first set of estimates utilizing a global or high-order filter (G/HF).

4. The method of claim 1, wherein the computing the second set of estimates of the plurality of navigation measurement values comprises computing the second set of estimates utilizing an EKF.

5. The method of claim 1, wherein the comparing the first set of estimates to the second set of estimates comprises computing a statistical distance between the first set of estimates and the second set of estimates, defining a distance threshold level, and comparing the distance threshold level with the computed statistical distance.

6. The method of claim 5, further comprising determining when the computed statistical distance is less than the distance threshold level, and when the computed statistical distance is less than the distance threshold level, determining that the first set of estimates is consistent with the second set of estimates.

7. The method of claim 5, further comprising determining when the computed statistical distance is less than the distance threshold level, and when the computed statistical distance is not less than the distance threshold level, determining that the first set of estimates is not consistent with the second set of estimates and is potentially divergent.

8. The method of claim 1, wherein the determining when the second set of estimates is statistically consistent with the first set of estimates comprises:
   computing a first mean and a first covariance matrix for a first estimated probability density function (PDF) associated with a low-order local filter;
   computing a second mean and a second covariance matrix for a second estimated PDF associated with global or high order filter;
   computing a combined mean and covariance state estimate for the first estimated PDF and the second estimated PDF;

computing a plurality of separation statistics for the first estimated PDF and the second estimated PDF;
computing a first distance threshold for the first estimated PDF and a second distance threshold for the second estimated PDF;
determining when a separation statistic associated with the first estimated PDF is less than the first distance threshold, and a separation statistic associated with the second estimated PDF is less than the second distance threshold; and
when the separation statistic associated with the first estimated PDF is less than the first distance threshold, and the separation statistic associated with the second estimated PDF is less than the second distance threshold, determining that the first set of estimates are consistent with the second set of estimates.

9. The method of claim 1, wherein the vehicle in transit is at least one of an aircraft, spacecraft, satellite, land-based vehicle, or water-based vehicle in transit.

10. A method for monitoring integrity of estimated navigation information, comprising:
receiving a plurality of navigation measurement values for a vehicle in transit from a sensor set;
computing a first set of estimates of the estimated navigation information utilizing a system model, the plurality of navigation measurement values, and a global filter or a local filter having an order O;
computing a second set of estimates of the estimated navigation information utilizing the system model, the plurality of navigation measurement values, and a local filter having an order lower than O;
comparing the first set of estimates to the second set of estimates;
determining when the second set of estimates is statistically consistent with the first set of estimates;
when the second set of estimates is statistically consistent with the first set of estimates:
  computing a plurality of subsets of the first set of estimates for the plurality of navigation measurement values utilizing the global filter or the local filter having order O;
  computing a plurality of subsets of the second set of estimates for the plurality of navigation measurement values utilizing the local filter having the order lower than O;
  computing a sub-solution for each sub-set of the first set of estimates of the plurality of navigation measurement values;
  computing a sub-solution for each sub-set of the second set of estimates of the plurality of navigation measurement values;
  computing an integrity value for each sub-solution for the first set of estimates;
  computing an integrity value for each sub-solution of the second set of estimates; and
  combining the integrity values for the sub-solutions of the first set of estimates with the integrity values for the sub-solutions of the second set of estimates;
calculating enhanced-integrity navigation values based on the combined integrity values; and
coupling the enhanced-integrity navigation values to the vehicle in transit.

11. The method of claim 10, wherein the computing the first set of estimates of the navigation information comprises utilizing the system model, the plurality of navigation measurement values, and a G/HF.

12. The method of claim 10, wherein the computing the plurality of subsets of the first set of estimates for the plurality of navigation measurement values comprises utilizing a G/HF, and the computing the plurality of subsets of the second set of estimates for the plurality of navigation measurement values comprises utilizing an EKF.

13. The method of claim 10, wherein the computing the integrity value for each sub-solution for the first and second sets of estimates comprises computing the integrity values utilizing a G/HF full-solution and a plurality of G/HF sub-solutions, and computing the integrity values utilizing an EKF full-solution and a plurality of EKF sub-solutions.

14. A navigation system, comprising:
a sensor set configured to generate a plurality of navigation state measurement values for a vehicle in transit; and
a state estimator coupled to the sensor set, wherein the state estimator is configured to receive a plurality of the navigation measurement values, compute a first set of estimates of the plurality of navigation measurement values utilizing a global filter or a local filter having an order O and a system model, compute a second set of estimates of the plurality of navigation measurement values utilizing a local filter having an order lower than O and the system model, compare the first set of estimates to the second set of estimates, determine when the second set of estimates is statistically consistent with the first set of estimates, and when the second set of estimates is statistically consistent with the first set of estimates, compute a plurality of sub-sets of the second set of estimates of the plurality of navigation measurement values, compute a sub-solution for each sub-set of the second set of estimates of the plurality of navigation measurement values, and compute an integrity value for each sub-solution;
wherein the navigation system provides enhanced-integrity navigation values based on the first set of estimates, the second set of estimates, and the integrity value for each sub-solution for coupling to the vehicle in transit.

15. The navigation system of claim 14, wherein the state estimator is configured to compute the first set of estimates utilizing a G/HF.

16. The navigation system of claim 14, wherein the state estimator is configured to compute the second set of estimates utilizing an EKF.

17. The navigation system of claim 14, wherein the state estimator is configured to compute the second set of estimates utilizing the filter having the order lower than O.

18. The navigation system of claim 14, wherein the state estimator is configured to compute a statistical distance between the first set of estimates and the second set of estimates, define a distance threshold level, and compare the distance threshold level with the computed statistical distance.

19. The navigation system of claim 14, wherein the vehicle in transit is at least one of an aircraft, spacecraft, satellite, land-based vehicle, or water-based vehicle in transit.

* * * * *